April 11, 1939.  F. WUNDERLICH  2,153,735
NOISELESS ONE-WAY CLUTCH MECHANISM FOR THE SILENT RETURN
OF THE PAPER CARRIAGE IN WRITING MACHINES
Filed March 19, 1937
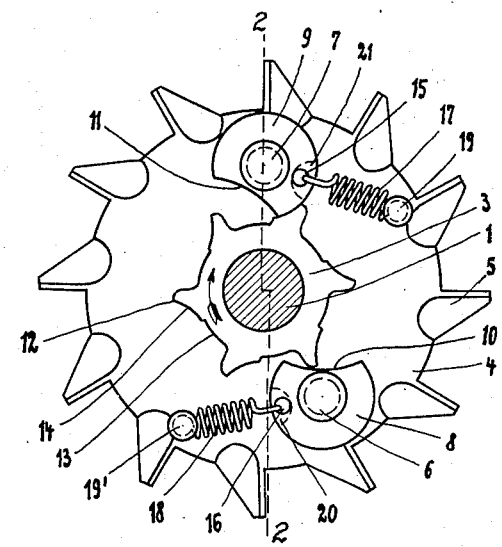
Fig. 1
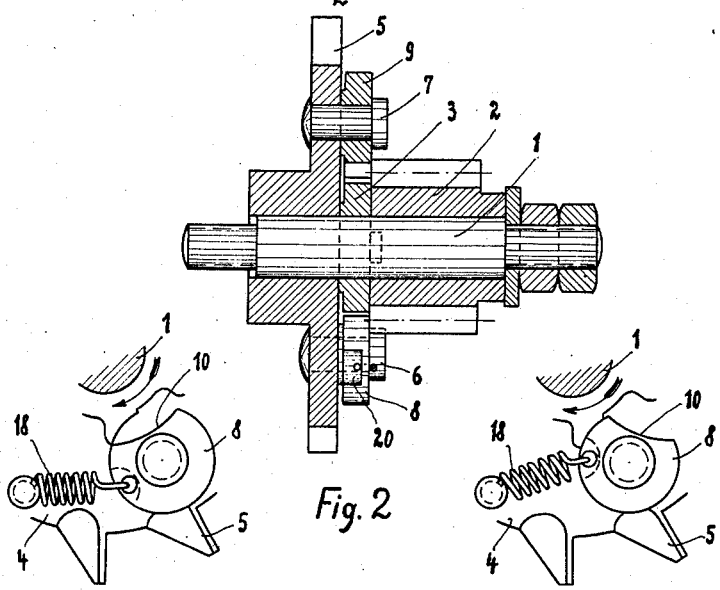
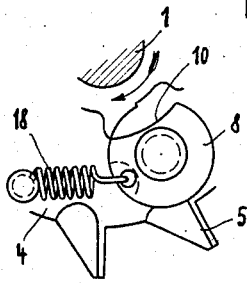
Fig. 3  Fig. 4

Patented Apr. 11, 1939

2,153,735

UNITED STATES PATENT OFFICE 2,153,735

NOISELESS ONE-WAY CLUTCH MECHANISM FOR THE SILENT RETURN OF THE PAPER CARRIAGE IN WRITING MACHINES

Fritz Wunderlich, Nuremberg, Germany, assignor to the firm Triumph-Werke Nurnberg A.-G., Nuremberg, Germany Application March 19, 1937, Serial No. 131,946 In Germany March 20, 1936

2 Claims. (Cl. 192—46)

Various devices have already become known for returning the paper carriage silently in writing machines. With these known arrangements spring pawls are in general provided, which engage in escapement or ratchet wheels, and which are brought into and out of engagement by means of frictional members or like devices. The disadvantage of this carriage return resides in the fact that the left-hand writing margin becomes uneven, since the pawl or the loose ratchet tooth frequently does not engage with certainty. The letter at the beginning of the line then only makes its impression at the second or third position. Furthermore with these devices a loud noise occurs when the carriage is drawn back.

The present invention obviates these disadvantages by mounting on the escapement wheel cylindrical rotary keys which are rotatable about the axis of the cylinder, and which are formed with a recess, and can oscillate about a mid position given by a tension spring in such a way that they bear against curved surfaces provided on the coupling wheel, the radius of these curved surfaces corresponding to the radius of the cylinder. It is advantageous to select the position of the curved surface on the ratchet wheel in such a way that the rotary keys can swing past freely. When the number of coupling possibilities is large, it is advantageous to provide at least two rotary keys on the escapement wheel. The angular position of these in relation to the coupling surfaces of the coupling wheel is such that only one of the rotary keys comes into engagement at a time.

The invention is illustrated by way of example in the accompanying drawing, in which Figure 1 shows the device according to the invention in elevation;

Figure 2 is a section on the line 2—2 in Figure 1, and

Figures 3 and 4 show details in elevation.

Upon a stationary shaft 1 the toothed wheel 2 of the carriage is rotatably mounted. This wheel is rigidly connected with a coupling wheel 3. There is also rotatably mounted upon the shaft 1 an escapement wheel 4 with ratchet teeth 5. Upon this escapement wheel rotary keys 8 and 9 are mounted by means of rivets or studs 6 and 7 respectively, these keys being cylindrical in shape, with recesses 10 and 11 respectively.

The coupling wheel 3 has teeth 12, which, on the side opposite to the free running direction, have curved faces 14. These faces have the same radius of curvature as the cylindrical faces of the rotary keys 8 and 9. The portion 13 of the gap between two of the teeth 12 is so arranged that it lies outside the circle struck from the centre of the rivets or studs 6, 7 with the radius of the cylinder.

The rotary keys 8 and 9 are provided with holes 15 and 16, in which there engage springs 17 and 18, which are secured to the escapement wheel 4 at 19 and 19'. Furthermore the rotary keys are recessed by providing cavities 20 and 21.

This apparatus operates in the following manner: By the action of the springs 17 and 18 the rotary keys, as shown in the case of the rotary key 9, are in general held in a position in which the centre line of the spring passes through the axis of the stud 7. Now if, during the return of the carriage, the coupling wheel 3 moves in the direction of the arrow in Figure 3, the rotary key 9, at first remains in the position represented in Figure 1, until the next tooth 12 strikes against the lower portion of the recess 11 in the rotary key 9. The rotary key 9 is then rotated in a counter-clockwise direction, stretching the spring 17, so that the tooth 12 can slip through beneath it. After the tooth has slipped through, the rotary key, by virtue of its momentum, swings back somewhat beyond the mid position, as shown in Figure 4, and is then returned into its initial position again by the action of the spring 17. If on the other hand the wheel 3 is rotated in the direction opposite to that indicated by the arrow in Figure 1, the surface 14 of the toothed wheel 3 bears against the cylindrical surface of the rotary key 9 and the toothed wheel 2, which is rigidly connected with the coupling wheel 3, is thereby firmly coupled to the ratchet wheel 4.

Since the contact surfaces between the curved faces 14 on the coupling wheel 3 and the peripheral surfaces of the rotary keys 8 and 9 have their centres of curvature at the axes of the keys, the coupling wheel, when rotating in a counter-clockwise direction, has no tendency to rotate the keys about their pivots. All that the springs have to do, therefore, is to return the rotary keys to their mid positions when released after being displaced.

It will therefore be realized that the tension in the springs 17 and 18 need only be very slight. When the coupling wheel is rotating in the direction of the arrows in Figures 1, 3 and 4 the teeth 12 do not strike a direct blow against the key 8 or 9 and knock it aside but meet it at an angle and displace it progressively. Moreover the resisting torque produced by the spring is a minimum when the tooth meets the curved surface of the recess 11. It may even happen, owing to the slight torsional oscillation of the key following the passage of the preceding tooth, that the next tooth will overtake the surface 11 at a moment when the latter is moving in the same direction, thereby still further diminishing the impact. Hence the return of the carriage will be very quiet.

If more than one rotary key is provided, which is advantageous when the number of coupling possibilities is large, these keys, as shown in Figure 1, are so arranged that there is always only one rotary key engaged. The number of teeth of the coupling wheel 3 can thereby be materially reduced. This number is equal to the number of teeth of the escapement wheel 4 divided by the number of rotary keys.

What I claim is:

1. A noiseless return mechanism for the paper carriage in writing machines, comprising a stationary pivot mounted fast in the writing machine, a toothed coupling wheel rotatable upon the stationary pivot, an escapement wheel rotatable upon the stationary pivot, at least one substantially cylindrical key rotatably mounted eccentrically on one side of the escapement wheel, concave faces on the teeth of the coupling wheel, the radius of curvature of these concave faces being equal to that of the cylindrical key, a tension spring secured at one end to the escapement wheel and at the other end to the rotatable key to hold the key normally in a mid position to either side of which it can rotate by stretching the spring, and the concave faces on the coupling wheel being adapted in certain positions to bear against the periphery of the rotatable key, the rotatable key being formed with a recess in its periphery to permit the teeth of the coupling wheel to deflect it and pass it in one direction of rotation, and the radius of the peripheral surface of the coupling wheel in the spaces between its teeth, plus the radius of the cylindrical key, being slightly less than the distance between their axes, so that the key can oscillate past its contact position.

2. A noiseless return mechanism for the paper carriage in writing machines, comprising a stationary pivot mounted fast in the writing machine, a toothed coupling wheel rotatable upon the stationary pivot, an escapement wheel rotatable upon the stationary pivot, at least two substantially cylindrical keys rotatably mounted eccentrically on one side of the escapement wheel, a tension spring for each of the rotatable keys, each spring being secured at one end to the escapement wheel and at the other end to the rotatable key to hold the key normally in a mid position to either side of which it can rotate by stretching the spring, and concave faces on the teeth of the coupling wheel, the radius of curvature of these concave faces being equal to that of the cylindrical keys, the concave faces on the coupling wheel being adapted in certain positions to bear against the periphery of the rotatable keys, each rotatable key being formed with a recess in its periphery to permit the teeth of the coupling wheel to deflect it and pass it in one direction of rotation, the radius of the peripheral surface of the coupling wheel, in the spaces between its teeth, plus the radius of either cylindrical key, being slightly less than the distance between the axis of the coupling wheel and the axis of the key, so that the key can oscillate past its contact position, the keys beng in staggered relationship to the concave surfaces of the coupling wheel, so that only one of the keys at a time can bear with its cylindrical surface against a concave surface on the coupling wheel, and the number of teeth on the coupling wheel being equal to the number of teeth on the escapement wheel divided by the number of rotatable cylindrical keys.

FRITZ WUNDERLICH.